(12) United States Patent
Pulek et al.

(10) Patent No.: US 6,391,200 B2
(45) Date of Patent: *May 21, 2002

(54) FILTER AND METHOD OF FILTERING A FLUID

(75) Inventors: John L. Pulek, Cheshire; Thomas J. Hamlin, Vernon; Richard Sale, Toland; C. Thomas Paul, Madison, all of CT (US)

(73) Assignee: Cuno Incorporated, Meriden, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/412,419

(22) Filed: Oct. 5, 1999

Related U.S. Application Data (60) Provisional application No. 60/103,233, filed on Oct. 5, 1998.

(51) Int. Cl.[7] .......................... B01D 29/21; B01D 29/58
(52) U.S. Cl. .................. 210/497.1; 210/437; 210/457; 210/489; 210/492; 210/499; 55/488; 55/489; 55/520; 55/527
(58) Field of Search .................... 210/488–489, 210/492, 484, 497.01, 497.1, 483, 335, 499, 490, 437, 457; 55/485–486, 520, 527

(56) References Cited

U.S. PATENT DOCUMENTS

| | | | | |
|---|---|---|---|---|
| 1,102,685 A | * | 7/1914 | Proper | 210/350 |
| 2,741,160 A | * | 4/1956 | Fogwell | |
| 2,742,160 A | * | 4/1956 | Fogwell | 210/457 |
| 2,774,127 A | | 12/1956 | Secrist | |
| 3,397,793 A | * | 8/1968 | MacDonell | 210/457 |
| 3,415,384 A | * | 12/1968 | Kasten | 210/484 |
| 4,046,697 A | * | 9/1977 | Briggs et al. | 210/457 |
| 4,062,756 A | | 12/1977 | Jha et al. | |
| 4,126,560 A | | 11/1978 | Marcus et al. | |
| 4,144,370 A | * | 3/1979 | Boulton | |
| 4,172,797 A | | 10/1979 | Robichaud et al. | |
| 4,360,433 A | | 11/1982 | Walker et al. | |
| 4,555,342 A | | 11/1985 | Grant | |
| 4,594,202 A | | 6/1986 | Pall et al. | |
| 4,609,465 A | | 9/1986 | Miller | |

(List continued on next page.)

FOREIGN PATENT DOCUMENTS

| | | |
|---|---|---|
| CA | 1319626 | 8/1987 |
| EP | 0306 231 B1 | 8/1989 |
| JP | HEI 1-297113 | 5/1988 |
| JP | 2791775 | 5/1988 |
| JP | HEI6-12809 | 12/1988 |
| WO | 92/16281 | 10/1992 |

*Primary Examiner*—Matthew O. Savage
*Assistant Examiner*—Marianne S. Ocampo
(74) *Attorney, Agent, or Firm*—Cummings & Lockwood (57) ABSTRACT

A spiral wound filter element is disclosed which includes alternating layers of filter medium and diffusion medium wrapped about a cylindrical core defining a central axis of the filter element. The alternating layers extend from a radially innermost layer of the filter element to a radially outermost layer of the filter element, the diffusion medium is defined by a continuous lengthwise sheet of mesh material, and the filter medium is defined by at least one sheet of filter material arranged along the length of the continuous sheet of mesh material. The alternating layers of filter medium and diffusion medium define three distinct radially disposed layered filtering sections surrounding the cylindrical core, and include a first filtering section having radially outer prequalifying layers, a second filtering section having middle prequalifying layers and a third filtering section having radially inner qualifying layers. The radially outer prequalifying layers and the middle prequalifying layers define about two-thirds of the radial distance from the radially outermost layer of the filter element to the radially innermost layer of the filter element.

42 Claims, 6 Drawing Sheets

U.S. PATENT DOCUMENTS

| | | |
|---|---|---|
| 4,629,569 A | 12/1986 | Gimbel |
| 4,726,901 A | 2/1988 | Pall et al. |
| 4,799,944 A | 1/1989 | Dixon et al. |
| 4,805,656 A | 2/1989 | Cole et al. |
| 4,821,800 A * | 4/1989 | Scott et al. |
| 4,863,602 A * | 9/1989 | Johnson ..................... 210/484 |
| 4,877,526 A | 10/1989 | Johnson et al. |
| 4,877,527 A | 10/1989 | Brownell |
| 4,882,056 A | 11/1989 | Degen et al. |
| 5,015,376 A | 5/1991 | Picek |
| 5,015,379 A | 5/1991 | Drori |
| 5,039,413 A | 8/1991 | Harwood et al. |
| 5,174,895 A | 12/1992 | Drori |
| 5,215,661 A | 6/1993 | Tanabe |
| 5,279,731 A | 1/1994 | Cook et al. |
| 5,290,446 A * | 3/1994 | Degen et al. ............... 210/489 |
| 5,336,405 A | 8/1994 | Tang et al. |
| 5,460,721 A | 10/1995 | Goodwin |
| 5,468,382 A | 11/1995 | Cook et al. |
| 5,591,335 A | 1/1997 | Barboza et al. |
| 5,605,748 A * | 2/1997 | Kennedy et al. |
| 5,620,599 A | 4/1997 | Hopkins et al. |
| 5,639,370 A | 6/1997 | Fall et al. |
| 5,664,628 A * | 9/1997 | Koehler et al. |
| 5,702,616 A | 12/1997 | Degen et al. |
| 5,755,962 A * | 5/1998 | Gershenson et al. ........ 210/452 |
| 6,071,419 A * | 6/2000 | Beier et al. ................. 210/767 |

* cited by examiner

FIG_1

FIG_2

FIG_8

FIG_9

FIG. 10

FILTER AND METHOD OF FILTERING A FLUID

CROSS REFERENCE TO RELATED APPLICATIONS

The present application claims priority to U.S. provisional patent application Ser. No. 60/103,233, filed Oct. 5, 1998, the disclosure of which is incorporated herein by reference.

BACKGROUND OF THE DISCLOSURE

1. Technical Field

The present disclosure relates, in general, to a filter, a method of making a filter and a method of filtering a fluid.

More particularly, the present disclosure relates to a filter having alternating layers of non-filtering diffusion medium and filter medium. Some of the layers of the filter medium are provided with bypass apertures, while the remaining layers do not include bypass apertures so that they act as qualifying layers for the filter. Filters according to the present disclosure have been found to provide improved fluid distribution over the filter medium, reduced pressure drop and increased filter life, without a reduction in filter rating.

2. Discussion of Background Disclosures

In general, a filter assembly is used for removing contaminants from fluids, i.e., liquids or gases. Such filter assemblies, for example, are used in chemical and hydrocarbon applications such as polyethylene manufacturing, food and beverage applications, electronic applications such as circuit board construction, coating applications such as high quality spray painting, and industrial applications such as paper manufacturing. Many filter assemblies include a tubular filter cartridge contained in a filter housing. The filter housing includes a sump, wherein the filter cartridge sits, and a head sealing the filter cartridge within the sump such that the housing acts as a fluid-tight pressure vessel. The filter head includes an inlet between the sump and the filter cartridge, and an outlet aligned with the tubular filter cartridge. Contaminated fluid is pumped into the filter housing through the inlet, and radially inwardly through the filter cartridge to produce filtered fluid, which then exits the filter housing through the outlet.

Normally, such a filter cartridge includes an elongated, tubular, perforated core wrapped with layers of depth filter medium. A typical depth filter medium is a non-woven, porous, melt-blown sheet or sheets of polypropylene micro fibers. The depth filter medium can have a uniform pore structure or a graded or tapered pore structure, whereby the pore size of the depth filter medium decreases in the direction of fluid flow, i.e. from an outer to an inner diameter of the filter. The depth filter medium can also be provided with fibers of varying diameter.

Even with a tapered pore structure and/or varying fiber diameters, however, it has been found that many depth filters actually act as "low area" surface filters, since only one or two of the multiple layers of filter medium within the depth are heavily loaded and plugged with contaminants after use, while the remaining layers are relatively clean (it should be noted that these are general observations, as the performance of a particular filter can depend on the particle size and distribution of contaminants in a fluid to be filtered). When a depth filter cartridge mimics a surface filter and collects contaminants in primarily one layer, the results are an inefficient distribution of fluid over the filter medium, a higher pressure drop for fluid passing through the filter and a lower flow rate capability for the filter. Such filters also tend to have a shorter useful life, and thus must be replaced more often.

A variety of depth filter cartridge configurations have been proposed and/or utilized over the years in efforts to provide improved performance. For example, U.S. Pat. No. 4,863,602 to Johnson shows a filter element that includes a plurality of layers of flexible, fluid permeable filtering material, at least one layer of which includes an opening through which fluid may pass, a layer of flexible, fluid-permeable, substantially nonfiltering transport material, and a layer of flexible prefiltering material positioned upstream of the plurality of layers of filtering material to "filter out from the fluid substantially all particles that could otherwise become lodged in the transport material but not to filter out significantly smaller particles."

U.S. Pat. Nos. 5,174,895 and 5,015,379 to Drori disclose filter elements featuring at least one coiled filter strip defining first and second butt ends. The Drori filter elements fail to optimally enhance fluid flow while providing extended filter service life. Additional filter designs of background interest are disclosed in U.S. Pat. No. 4,877,526 to Johnson; U.S. Pat. No. 4,882,056 to Degen et al.; U.S. Pat. No. 5,468,382 to Cook et al.; and U.S. Pat. No. 5,591,335 to Barboza et al.

Despite the various configurations known in the art, however, there remains a need for a filter cartridge providing improved distribution of fluid over the filter medium therein, a lower pressure drop and long useful life, without reducing the filter rating and that is economical to manufacture and utilize.

SUMMARY OF THE DISCLOSURE

A filter for filtering contaminated fluid is disclosed herein. A preferred filter includes alternating layers of a filter medium and a diffusion medium, with at least a portion of the layers of the filter medium having bypass apertures and acting as pre-qualifying filter medium layer(s).

The diffusion medium includes a first plane of spaced-apart, substantially parallel strands defining first longitudinal passages. The longitudinal passages have a height dimension and a width dimension. The diffusion medium further includes a second plane of spaced-apart, substantially parallel strands defining second longitudinal passages. The second longitudinal passages also define a height dimension and a width dimension. The diffusion medium's second plane of strands are oriented in a non-parallel manner with respect to the strands of the first plane such that the first and the second planes define lateral openings. Those lateral openings define side dimensions. The first and the second longitudinal passages are sized such that at least one dimension is smaller than any of the side dimensions of the lateral openings.

Filters of the type disclosed herein demonstrate superior fluid distribution over the filter medium contained therein, and an optimum use of the filter medium. Filters according to the present disclosure, therefore, have an increased life and a lower pressure drop without a reduction in filter rating, and provide more cost effective filtering.

The filters of the present disclosure may be used in methods to filter contaminated fluids in a wide range of commercial applications. Such filters and filtration methods are described in greater detail hereinbelow.

BRIEF DESCRIPTION OF THE DRAWINGS

To provide those of ordinary skill in the art to which the present disclosure pertains with an understanding as to how to construct a filter as disclosed and claimed herein, filters according to the present disclosure are described in detail below with reference to the attached drawings wherein:

DETAILED DESCRIPTION

Referring to FIGS. 1 through 5, a filter cartridge 10 according to the present disclosure includes an elongated, porous, rigid core 12 having a multiplicity of openings 36, and an elongated, hollow filter 14 coaxially mounted on the core 12. Annular end caps 38 are bonded to the ends of the filter to prevent contaminated fluid from by-passing the filter 14

Figure 1:
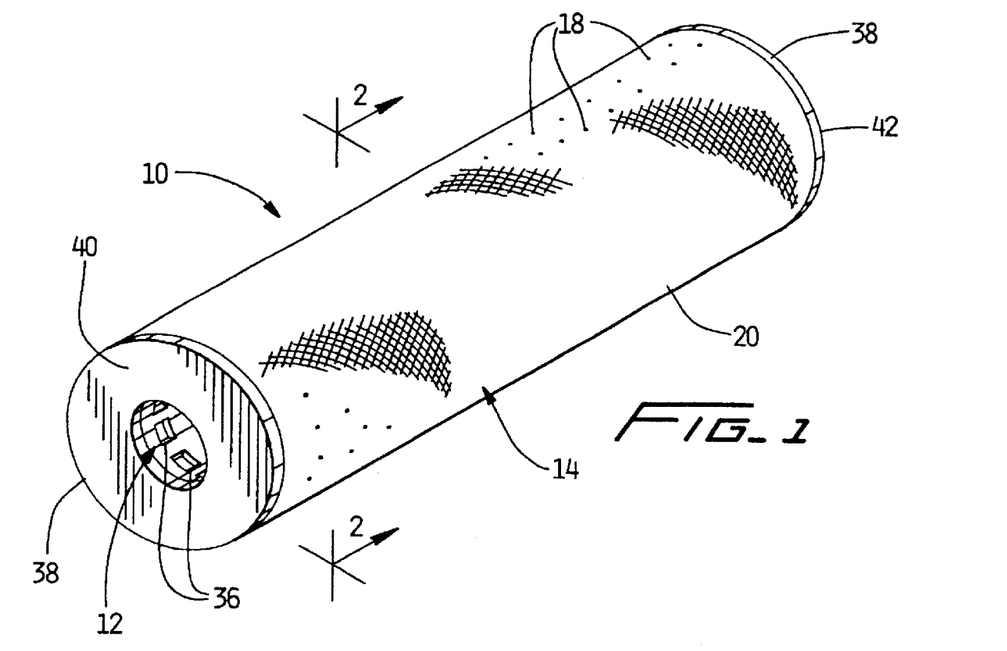
FIG. 1 shows an isometric side/end view of a filter cartridge of the type disclosed herein.
Figure 2:
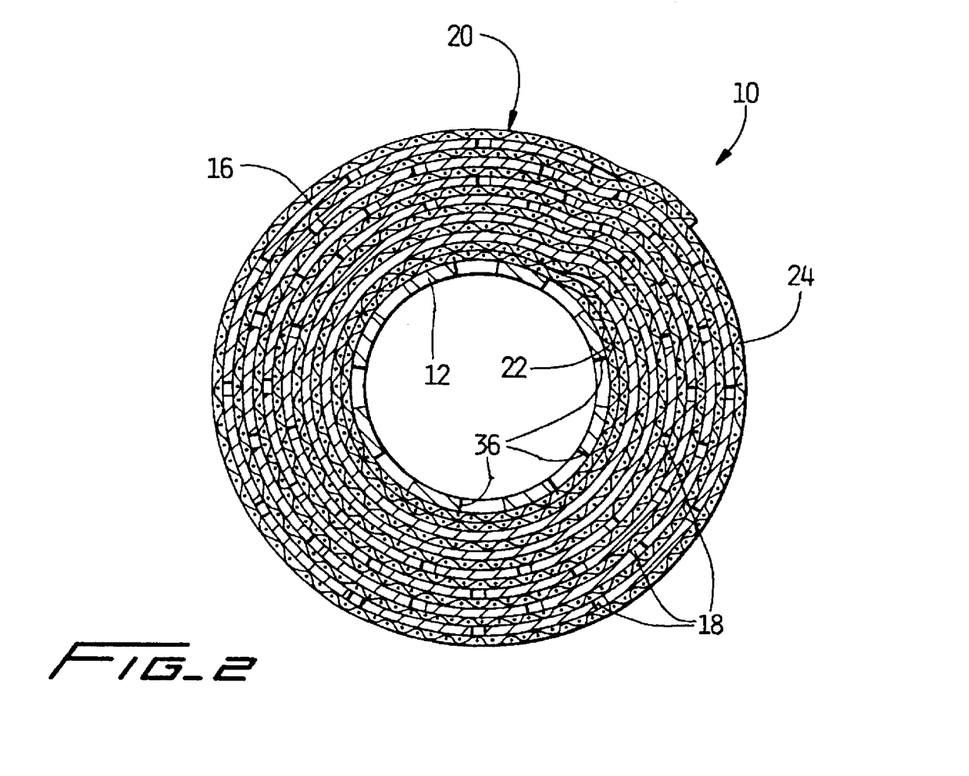
FIG. 2 shows an enlarged sectional view of the filter cartridge taken along line 2—2 of FIG. 1.

The filter 14 includes at least one sheet of filter medium 16, with at least a portion of the filter medium 16 including bypass apertures 18, and a sheet of non-filtering diffusion medium 20. The sheets of the filter medium 16 and the diffusion medium 20 are wrapped, or coiled, to form alternating layers of filter medium and diffusion medium extending from an innermost layer 22 to an outermost layer 24 of the filter 14. In a preferred embodiment, the diffusion medium 20 is bonded to itself at the outermost layer 24 to prevent the filter 14 from unwinding or unwrapping during shipping, handling and use. As such, the diffusion medium 14 defines the outermost layer 24 of the filter 14.

1. The Diffusion Medium

Figure 3:
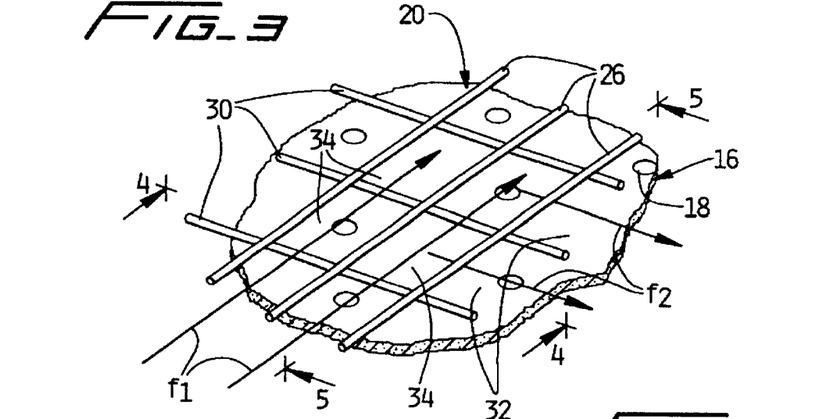
FIG. 3 shows an enlarged isometric view of a portion of a non-filtering diffusion layer and a non-qualifying filter layer of the filter cartridge of FIG. 1.
Figure 4:
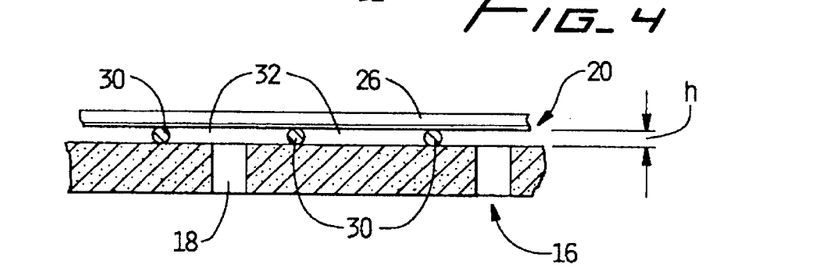
FIG. 4 shows a sectional view of the diffusion layer and the non-qualifying filter layer of the filter cartridge of FIG. 1 taken along line 4—4 of FIG. 3.

The diffusion medium 20 includes a first plane of spaced-apart parallel strands 26 forming longitudinal passages 28, and a second plane of spaced-apart parallel strands 30 forming longitudinal passages 32, as illustrated by arrows f1, f2 in FIG. 3. The strands 30 of the second plane are oriented such that they are not parallel with the strands 26 of the first plane, such that the first and the second planes form lateral openings 34. In a preferred embodiment, strands 26 are substantially perpendicular to strands 30. The longitudinal passages 28, 32 are preferably smaller in at least one dimension as compared to the smallest dimension of the lateral openings 34. In particular, a height h of the longitudinal passages 28, 32, as best shown in FIG. 4, is preferably smaller than the length or width of the lateral openings 34.

The longitudinal passages 28, 32 of the diffusion medium 20 distribute the fluid to be filtered through flow channels f1, f2, such that the diffusion medium 20 allows for, and assists in, the longitudinal, or circumferential and/or axial, flow of the contaminated fluid within the filter 14 between the innermost layer of the filter medium 16 and the core 12, and/or between adjacent layers of the filter medium. Such longitudinal flow assists in minimizing the pressure drop across the filter cartridge 10 and in dispersing the filtration function. The diffusion medium 20 is preferably positioned between the core 12 and the innermost layer of the filter medium 16 to facilitate the passage of fluid through the openings 36 in the core 12. In a preferred embodiment, the core 12 is surrounded by a plurality of diffusion medium 20 layers to provide a collection area for the flow prior to exiting through openings in the core 12. Positioning of the diffusion medium 20 between adjacent layers of the filter medium 16 similarly maximizes the use of the filter medium surface area within each layer for contaminant loading, thereby reducing pressure drop and optimizing filter medium usage to extend filter life.

In preferred embodiments, the dimensions of the lateral openings 34 and the longitudinal passages 28, 32 of the diffusion medium 20 are purposely selected to be substantially larger than any contaminant to be filtered from the contaminated fluid. As a result, the diffusion medium 20 does not act as a filter. Since the diffusion medium 20 does not act, and is not used, as a filter to trap contaminants, the diffusion medium does not substantially contribute to the pressure drop across the filter 14, and in fact minimizes the pressure drop by providing unobstructed flow channels f1, f2 for contaminated fluid. In addition, the diffusion medium 20 provides structural rigidity and protects the filter medium 16 from damage. The filter 14 is advantageously provided with an extra outer layer of the diffusion medium 20 to add support and protection to the filter 14.

The diffusion medium 20 is made from a suitable material that is temperature and fluid compatible with the filtering application to be carried out. Preferably, the diffusion medium 20 is made of a suitable thermoplastic. For example, for lower temperature filtering applications (i.e., below 180° F.), the thermoplastic can comprise polypropylene, while for higher temperature applications (i.e., above 180° F.) or chemical compatibility with different fluids, the thermoplastic can comprise nylon, polyester, or melt-processible fluoropolymer.

The diffusion medium 20 preferably comprises thirty thousandths of an inch (30 mils) thickness, bi-planar strand orientation (17 mil strand size), twelve strands per inch, polypropylene extruded netting/mesh. Such netting is available, for example, under the trademark Plastinet®, manufactured by Applied Extrusion Technologies, Inc. of Middleton, Del., or Naltex®, manufactured by Nalle Plastic, Inc. of Austin, Tex. The strands 26 of the first plane may be transversely oriented with respect to the strands 30 of the second plane such that the two planes form generally square or diamond-shaped lateral openings 34 having side dimension of about 0.066 inches. Thus, a preferred diffusion medium 20 exhibits a ratio between lateral opening 34 side dimensions to lateral passage 28, 32 height (hereinafter "Side-to-Height Ratio") of approximately 66:17 or 3.9:1. In addition, the sheet of the diffusion medium 20 is oriented so that the square lateral openings 34 form diamonds between ends 40, 42 of the cartridge 10 to advantageously distribute flow over the tubular filter.

Alternative netting dimensions may be utilized according to the present disclosure. In preferred embodiments, however, to ensure that the diffusion medium 20 does not function as a filter, the Side-to-Height Ratio should be greater than about 1.5:1 and preferably greater than 3:1. As noted hereinabove, a preferred diffusion medium 20 according to the present disclosure exhibits a Side-to-Height Ratio of about 4:1.

2. The Filter Medium

According to preferred embodiments of the present disclosure, the filter medium 16 is preferably of the depth filter type, wherein contaminants are trapped within the medium, as opposed to on an outer surface of the medium. A preferred depth filter medium 16 is comprised of one or more sheets of non woven thermoplastic micro fibers. The non woven thermoplastic micro fibers may be melt blown, spunbond, carded, or hydroentangled, for example. For lower temperature filtering applications (i.e., below 180° F.), the thermoplastic can comprise polypropylene, for example, while for higher temperature applications (i.e., above 180° F.) or chemical compatibility with other fluids, the thermoplastic can comprise nylon, polyester or melt-processible fluoropolymer, for example.

Furthermore, filter medium suitable for use in accordance with the present disclosure includes porous membrane, such as a cast nylon porous membrane available as Zetapore® from CUNO, Incorporated of Meriden, Conn. Other filter medium suitable for use in accordance with the present disclosure includes wet laid paper made with such raw materials as glass or cellulose. An example of a suitable wet laid filter medium is TSM®, available from CUNO, Incorporated of Meriden, Conn. Woven material can also be incorporated as the filter medium in accordance with the present disclosure.

The filter medium 16 is preferably provided in discrete sheet form, as opposed to being melt blown directly onto the diffusion medium, for example, such that the sheets can be inspected prior to being incorporated into the filter 14. The use of discrete sheets of depth filter medium 16 has been found to simplify quality control inspection of the filter medium and make the physical properties of each filter cartridge 10 more consistent. The ability to control the consistency of the physical properties of the depth filter medium 16 provides a unique ability to achieve sharp, well-defined, and optimized control over the removal efficiency and dirt capacity of the resulting filter cartridge 10. It should be understood, however, that a filter in accordance with the present disclosure could be provided with a single continuous sheet of filter medium.

Figure 5:
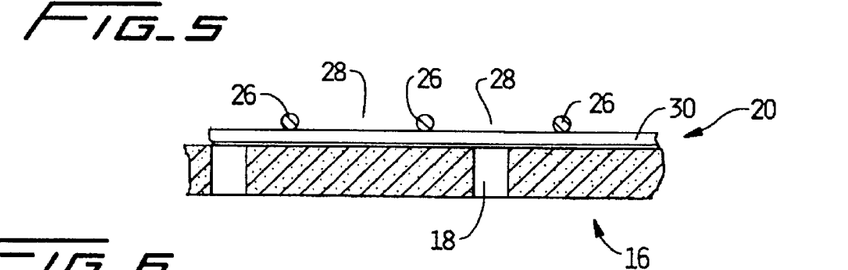
FIG. 5 shows a sectional view of the diffusion layer and the non-qualifying filter layer of the filter cartridge of FIG. 1 taken along line 5—5 of FIG. 3.
Figure 6:
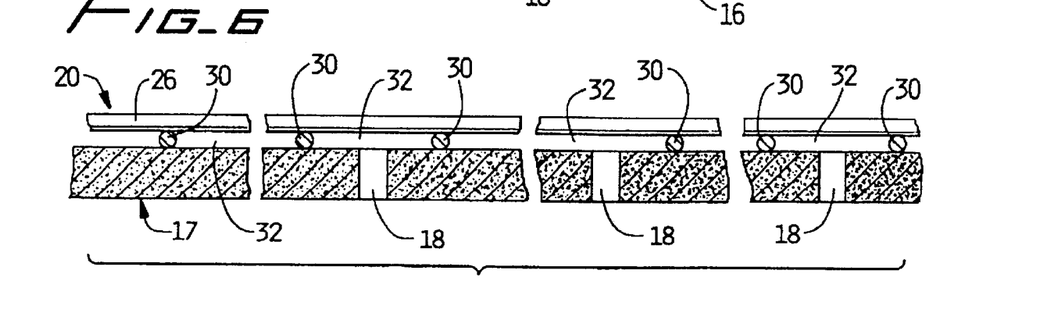
FIG. 6 shows a sectional view, similar to FIG. 4, of a diffusion layer and an alternative filter layer for use with the filter cartridge of FIG. 1.

According to preferred embodiments of the present disclosure, the porosity of the filter medium 16 may be constant between the inner and the outermost layers 22, 24 of the filter 14. Alternatively, a filter medium 16 can be provided having a porosity that varies between the outermost layer 24 and the innermost layer 22 of the filter, e.g., a filter having a tapered or graded pore structure. If, as preferred, the filter medium 16 comprises melt-blown, non woven polypropylene micro fibers, the pore size and/or fiber diameter geometries can be constant or varied between the outermost layer 24 and the innermost layer 22 of the filter. A depth filter medium 16 having a relatively uniform pore size and fiber geometry is shown in FIGS. 4 and 5, while a filter medium 17 having a decreasing pore size is shown in FIG. 6. The sheets of depth filter medium can also be processed, e.g., calendared or compressed, to change its porosity in instances where it is desired to utilize filter medium porosity to achieve desired filtration results.

3. The Bypass Apertures

According to preferred embodiments of the present disclosure, a portion of the depth filter medium 16 includes a multiplicity of spaced-apart bypass apertures 18. Preferably, the bypass apertures 18 extend from the outermost layer 24 of the depth filter medium 16 for a distance equal to between fifty and eighty-five percent (50%–85%) of the overall radial distance from the outermost layer 24 to the innermost layer 22 of the filter 14. Most preferably, the bypass apertures 18 are extend to about sixty-six percent (66%), i.e. two-thirds, of the radial distance from the outermost layer 24 to the innermost layer 22 of the filter 14.

According to the preferred embodiments, the filter medium layers 16 closest to the core 12 do not include bypass apertures such that all of the fluid must pass through the inner layers. In this way, the innermost layers of the filter medium 16 act as qualifying layers for the filter 14, thereby permitting the filter 14 to be rated based upon the particle retention of the qualifying layers. In like manner, the outer layers of filter medium 16 having the bypass apertures 18 act as pre-qualifying layers.

It should be noted, however, that if the filter cartridge 10 is to be used within a filter assembly wherein contaminated fluid is forced to flow radially outwardly therethrough, i.e., the orientation of the fluid flow through the filter cartridge 10 is to be reversed relative to the embodiments described heretofore, then the bypass apertures 18 may be advantageously provided to extend from the innermost layer of the depth filter medium 16 to a radial distance of about fifty to about eighty-five percent (50%–85%) of the overall radial distance between the innermost layer 22 and the outermost layer 24 of the filter 14. When so oriented, the inner layers of the filter medium 16 will act as pre-qualifying layers, while the outer layers act as the qualifying layers.

It should also be noted that a filter according to the present disclosure is not limited to the coiled designs shown in the attached figures. The unique elements of the present disclosure, i.e., alternating layers of filter and diffusion mediums as disclosed and claimed herein, can be utilized in other filter structures, such as a pleated filter cartridge or a filter bag.

The bypass apertures 18 may be uniformly spaced-apart in predetermined patterns, and provided as generally circular openings. The geometry and relative sizes of the apertures 18, however, may be advantageously varied, e.g., circular holes and elongated slots of varying sizes are contemplated, and combinations thereof. The apertures 18 may also be provided as slits, cuts or perforations in the filter medium 16, and such slits, cuts or perforations may be designed such that they do not fully open until a predetermined pressure differential is created across the filter cartridge 10. In addition, the multiplicity of bypass apertures may be provided in a number of different patterns, e.g., linearly aligned, diagonally aligned, or random, and the pattern(s) may vary from layer to layer of the filter medium 16.

During operation with a filter cartridge 10 in which the fluid flow is radially inward, contaminated liquid or gas passes laterally (i.e., radially) inwardly through the lateral openings 34 in the outermost layer(s) of the diffusion medium 20. The contaminated liquid or gas then contacts an outermost layer of the filter medium 16. Contaminated liquid or gas that does not immediately pass through the outermost layer of the filter medium 16 or the bypass apertures 18 in the filter medium may be directed longitudinally, or substantially parallel with respect to the outermost layer of the filter medium 16, through the longitudinal passages 28, 32 of the diffusion medium 20, depending on the relative resistance to flow.

For each of the non-qualifying layers of filter medium 16, the bypass apertures 18 allow a portion of the fluid to pass therethrough instead of passing through the filter medium of that particular layer. After passing through one of the non-qualifying layers of filter medium, the fluid passing through the bypass apertures 18 and the fluid passing through the filter medium 16 are re-mixed and diffused in the diffusion medium 20 before being filtered by the next layer of filter medium 16. The bypass apertures 18, accordingly, help utilize all available filter medium 16 and help to reduce the pressure drop through the filter 14. Preferably, the bypass apertures 18 provide uniform contamination loading of the non-qualifying layers of filter medium 16.

4. Performance

The combination of the filter medium 16, the diffusion medium 20 and the bypass apertures 18 in the manner described hereinabove has been found to have the synergistic effect of simultaneously increasing filtration capacity and minimizing pressure drop across the filter cartridge 10, without reducing the filter rating. This synergistic effect is demonstrated by the following test results:

- A filter cartridge ("Test Cartridge 1") utilizing non-filtering diffusion medium along with filter medium, but without bypass apertures, exhibits a filter life about two times greater than a "control" filter cartridge having neither non-filtering diffusion medium nor bypass apertures.
- A filter cartridge ("Test Cartridge 2") utilizing bypass apertures along with filter medium, but without diffusion medium as described herein, does not exhibit a greater filter life than the control filter cartridge.
- A filter cartridge 10 ("Test Cartridge 3") according to the present disclosure utilizing non-filtering diffusion medium 20 having a Side-to-Height Ratio of about 4:1 and relatively uniform bypass apertures 18 extending about two-thirds of the radial distance from the outermost layer to the innermost layer, exhibited three to four times the filter life of the control filter cartridge.
- A filter cartridge 10 ("Test Cartridge 4") according to the present disclosure utilizing both the non-filtering diffusion medium 20 and bypass apertures 18 as described for Test Cartridge 3, and wherein the number of bypass apertures 18 increases towards the outer diameter of the filter 14, exhibits from four to five times the filter life of a control filter cartridge.
- Test Cartridge 4 exhibits from two and a half to three times the filter life of a filter cartridge utilizing both non-filtering diffusion medium and bypass apertures, wherein the number of bypass apertures increases towards the outer diameter of the filter, and wherein the diffusion medium comprises a polyolefin spunbond web available as POWERLOFT® media from Kimberly-Clark Corporation of Roswell, Ga.

The advantageous performance described above for Test Cartridges 3 and 4 is confirmed by visual inspection. Upon dissection of the Test Cartridge 3 after testing, the filter medium 16 displayed contaminant loading to a radial depth from the outermost layer 24 of about fifty percent (50%) of the filter 14. In comparison, only the outermost layer of filter medium displayed contaminant loading in Test Cartridge 1.

Thus, the combination of the diffusion medium 20 and the bypass apertures 18 as described for Test Cartridges 3 and provides a synergetic effect that was not to be expected based upon the performances of Test Cartridges 1 and 2 possessing either non-filtering diffusion medium or bypass apertures, respectively, but not both.

The testing procedure included a single pass test at a flow rate of three gallons per minute of water containing between about 0.39 to about 1.0 grams per gallon of contaminant. Two standard contaminants were used: 0–30 micron contaminant (ISO COARSE, A.T.D. 12103-1, A4, available from Powder Technologies, Inc. of Burnsville, Minn.) and 0–10 micron contaminant (A.T.D. nominal 0–10 microns, also available from Powder Technologies, Inc). All of the filter cartridges tested had an outer diameter of about 2.5 inches and were about 10 inches long. The life of a filter for purposes of the tests is defined as the amount of contaminant challenged for the pressure drop across the filter to increase by 20 psid due to contaminant loading in the tested filter.

EXAMPLES

Additional exemplary filters made in accordance with the present disclosure are described hereinbelow. However, these exemplary filters are merely illustrative of filters that may be made according to the present teachings, and are not intended to be limiting thereof.

Example I

Figure 7:
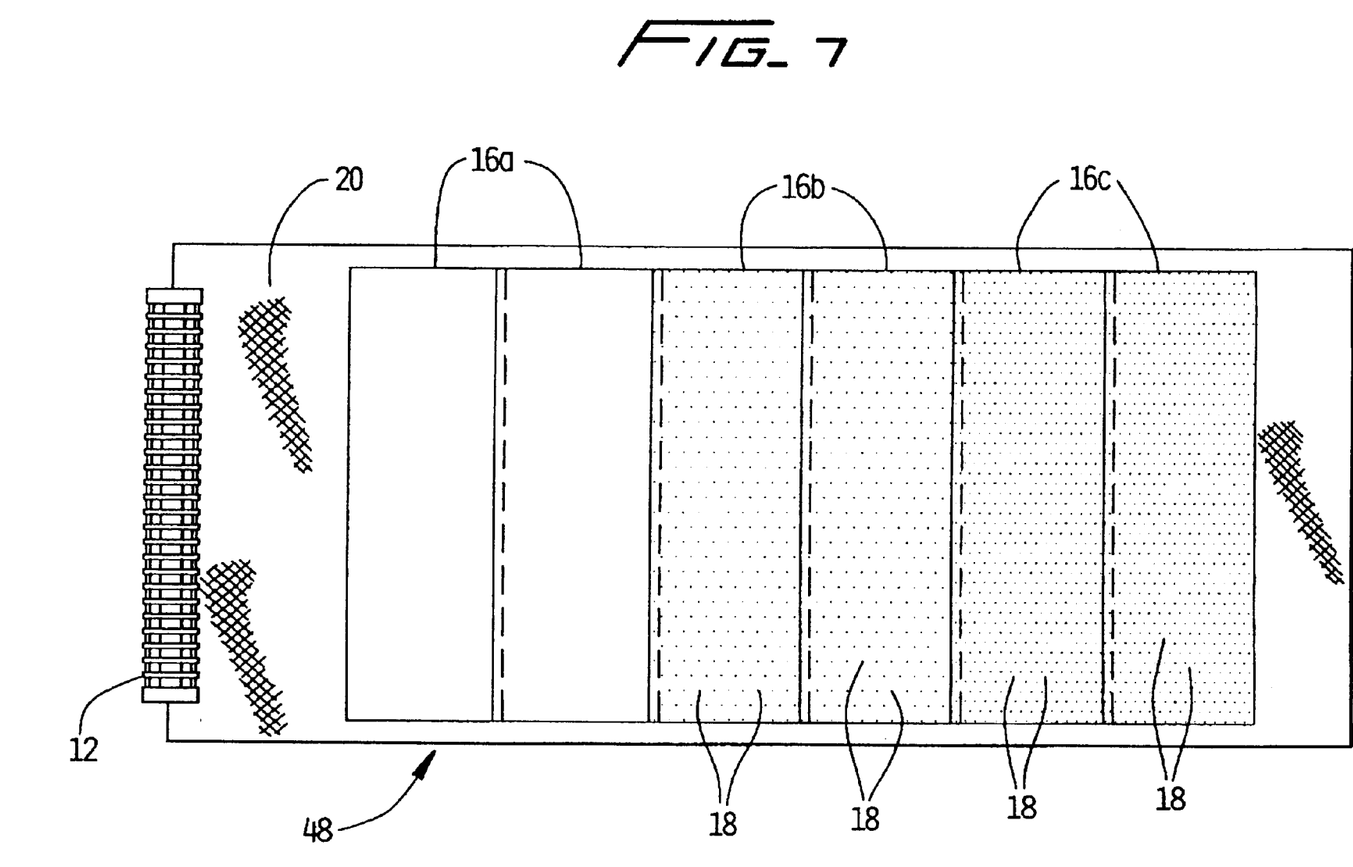
FIG. 7 shows a top plan view of a continuous sheet of non-filtering diffusion medium and sheets of filter medium being wound onto a core to form a filter cartridge of the type shown in FIG. 1.

Referring to FIG. 7, an exemplary filter 48 according to the present disclosure is shown. The filter 48 includes a single continuous sheet of diffusion medium 20 comprising thirty thousandths of an inch (30 mils), bi-planar strand orientation (17 mil strand size), twelve strands per inch, polypropylene extruded netting. The Side-to-Height Ratio of such diffusion medium is approximately 4:1. The filter material, which comprises melt-blown, non woven polypropylene micro fibers, is provided in a plurality of discrete sheets 16a, 16b, 16c. The plurality of sheets of filter medium 16a, 16b, 16c exhibit substantially equal and consistent pore size and fiber geometries. As shown, the ends of the sheets 16a, 16b, 16c are overlapped. The overlapping ends of the sheets 16a, 16b, 16c, however, are not sealed or bonded since the tightly wound sheet of the diffusion material 20 provides an adequate seal between the overlapping ends of filter medium.

Inner (with respect to the core 12) sheets 16a of the depth filter material do not have bypass apertures, while outer sheets 16b, 16c of the filter material have bypass apertures 18 (it should be noted that only the ends of the non-perforated qualifying layers 16a need to be overlapped). The outermost sheets 16c of filter material are preferably provided with more numerous bypass apertures 18 than the intermediate sheets 16b.

The bypass apertures 18 in sheets 16b, 16c are formed by perforating the sheets 16b, 16c prior to winding or coiling the sheets of diffusion medium 20 and filter medium 16a, 16b, 16c. In particular, sheets 16b are provided with circular perforations having diameters of about 5/32 inches, which are arranged in straight rows at intervals of about 1.2 inches, and wherein the rows are aligned and spaced at intervals of about 1.2 inch. Sheets 16c are provided with circular perforations having diameters of about 5/32 inches, which are arranged in straight rows at intervals of about 1.2 inches, and wherein the rows are staggered and spaced at intervals of about 0.6 inches. In sum, sheets 16c contain almost twice as many bypass apertures 18 as do sheets 16b. In general, it has been found that for a 2 to 2.5 inch outer diameter filter, rated between about 2 and about 70 microns, the apertures 18 should consume about 2.5 percent of the area of each of sheets 16c, and should consume about 1.25 percent of the area of each of sheets 16b.

A first end of the sheet of the diffusion medium 20 is secured to the core 12, using heat bonding for example, and the sheet is wound about the core to create a first or innermost layer of the diffusion medium. The sheet of diffusion medium 20 and the sheets of filter medium 16a, 16b, 16c are then coiled together about the innermost layer. The sheet of the diffusion medium 20 is longer than the sheets of the filter medium 16a, 16b, 16c such that the sheet of diffusion medium will form an outermost layer around the filter medium. The outermost layer of the diffusion medium 20 is then secured to the adjacent layer of diffusion medium, using heat bonding for example, such that the filter is tightly and securely wound. Surprisingly, it has been found that winding the layers tightly does not affect either the removal efficiency or the dirt capacity of the filter 48.

Example II

Figure 8:
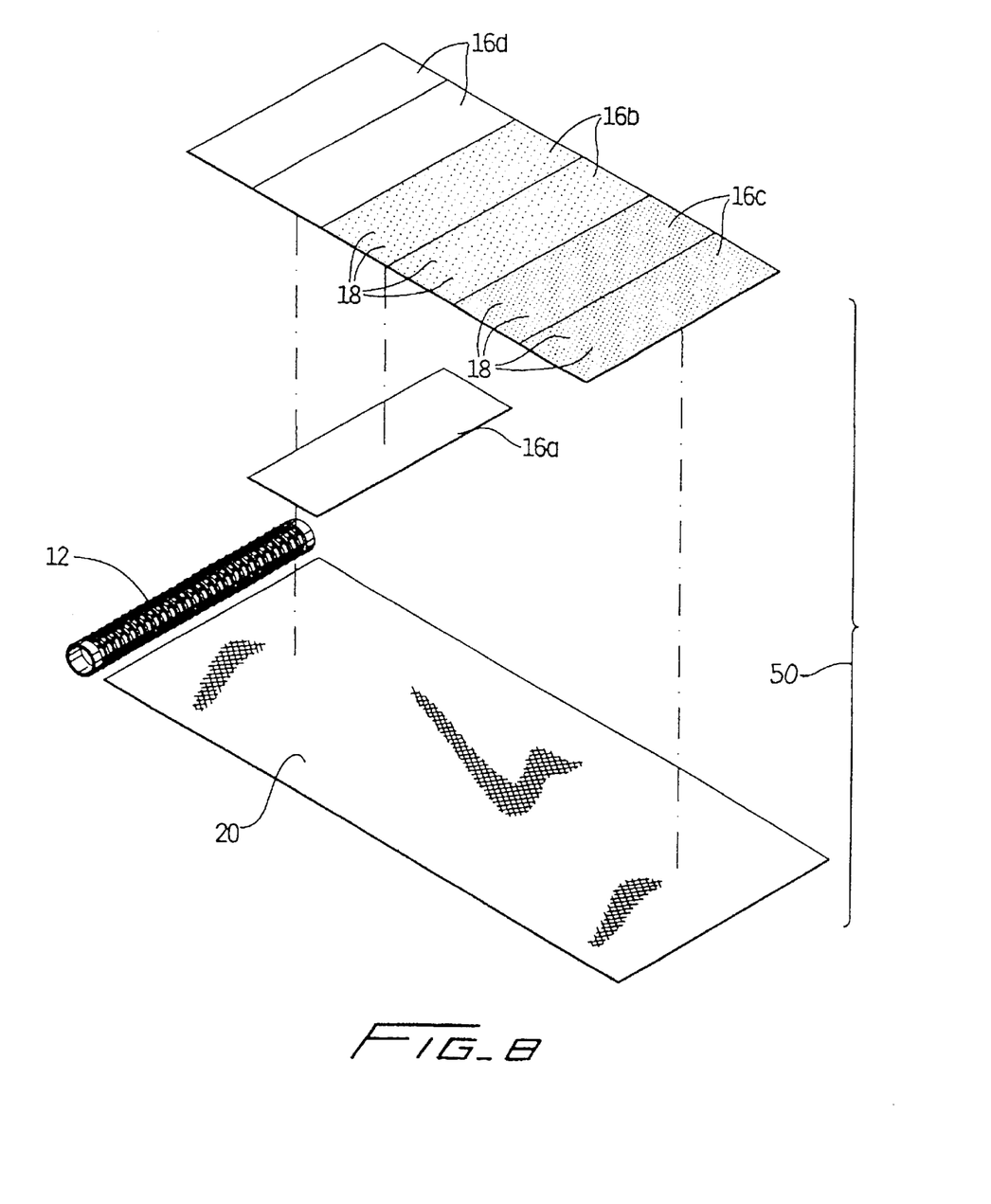
FIG. 8 shows an isometric, exploded view of a continuous length wise sheet of non-filtering diffusion medium and sheets of filter medium prior to being wound onto a core to form an alternative filter cartridge according to the present disclosure.

Referring to FIG. 8, a second example of a filter 50 according to the present disclosure is shown. The filter 50 includes a single continuous sheet of diffusion medium 20 comprising thirty thousandths of an inch (30 mils), bi-planar strand orientation (17 mil strand size), twelve strands per inch, polypropylene extruded netting. The Side-to-Height Ratio of the diffusion medium 20 is approximately 4:1. The filter material, which comprises melt-blown, non woven polypropylene micro fibers, is provided in a plurality of discrete sheets 16a, 16b, 16c, 16d.

The sheets of filter medium 16a, 16b, 16c exhibit substantially equal and consistent pore size and fiber geormetry. Sheet 16a does not have bypass apertures, while outer sheets 16b, 16c have bypass apertures 18. The outermost sheet 16c of filter material is preferably provided with more numerous bypass apertures 18 than the intermediate sheets 16b. Most preferably, the sheets 16b, 16c are perforated in a manner substantially similar to the corresponding sheets of FIG. 7.

Sheets 16d comprise melt-blown, non woven polypropylene micro fibers that are calendared, i.e., compressed between two rollers. Prior to being calendared, sheets 16d have an substantially identical fiber geometries to the fiber geometries of sheets 16a, 16b, 16c. In the calendering process, to the extent the dimensions of the fibers are affected, the fibers assume a greater dimension in the plane of the sheet 16d. As a result, after being calendared, the sheets 16d have a reduced pore diameter as compared to sheets 16a, 16b, 16c.

As shown, prior to the filter 50 being coiled, sheet 16a is placed under sheet 16d adjacent sheet 16b. After being coiled, the filter 50 includes: 1) inner layers of filter medium (innermost sheet 16d) having a reduced pore size, 2) intermediate layers of filter medium (laid over sheets 16a and 16d) that have a pore size that alternates between a relatively smaller and larger size, and 3) outer layers of filter medium (sheets 16b and 16c) that have a relatively larger pore size.

Example III

Figure 9:
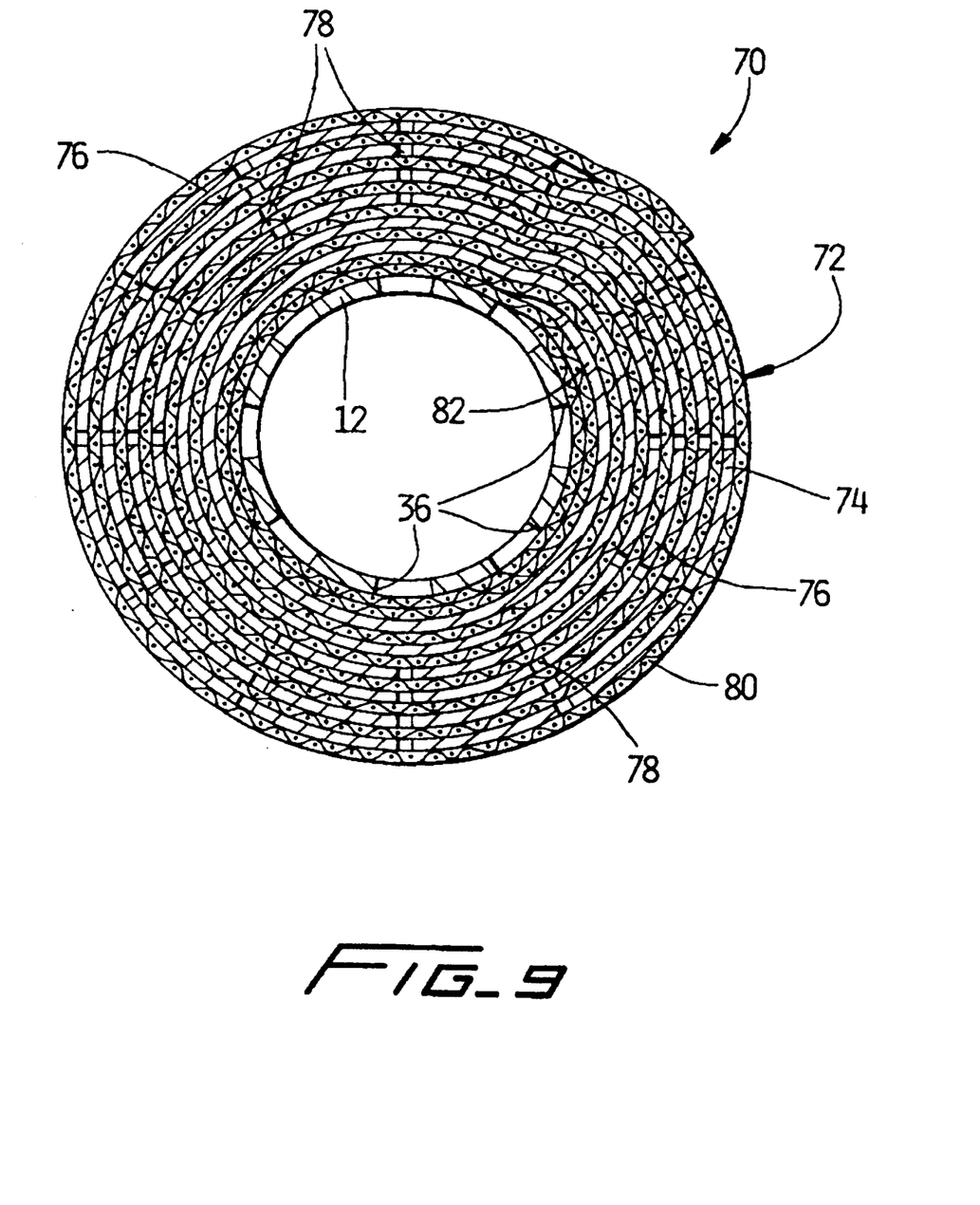
FIG. 9 shows a sectional view, similar to FIG. 2, of a further filter cartridge according to the present disclosure.

Referring to FIG. 9, another filter cartridge 70 according to the present disclosure is shown. The filter cartridge 70 is similar to the filter cartridge 10 of FIG. 7, and elements that are the same have the same reference numerals. The filter cartridge 70 includes a filter 72 having alternating layers of filter medium 74 and diffusion medium 76.

The filter medium 74 has bypass apertures provided therein and aligned with one another so as to form radial from bores 78 extending from an outermost layer 80 towards an innermost layer 82 of the filter. The radial bores 78 each extend to a uniform depth within the filter 72. Preferably, the bores 78 extend radially to between about fifty and eighty-five percent (50%–85%) of the radial distance from the outermost layer 80 to the innermost layer 82 of the filter 72. More preferably, each of the bypass bores 78 extends radially to about sixty-six percent (66%) of such radial distance. It should be noted that the filter medium of the filter cartridge 70 can be provided with bypass apertures formed by bores radially extending from an outermost layer 80 towards an innermost layer 82 of the filter, but to non-uniform depths within the filter 72.

A method for manufacturing the cartridge 70 generally includes winding or coiling the sheet of the diffusion medium 76 and the sheet(s) of the filter medium 74 into alternating layers extending between the innermost and the outermost layers 82, 80, and piercing the layers from the outermost layer towards the innermost layer to produce the multiplicity of bypass bores 78 in the filter. The bypass bores may be created by piercing the outermost layer 80 of the filter 70 with one or more elongated, narrow, sharp instruments, such as steel pins. A multiplicity of parallel steel pins, for example, are mounted on a flat base, and the filter cartridge 70 is simply pushed onto the spikes and pierced to create the bypass bores.

Example IV

Figure 10:
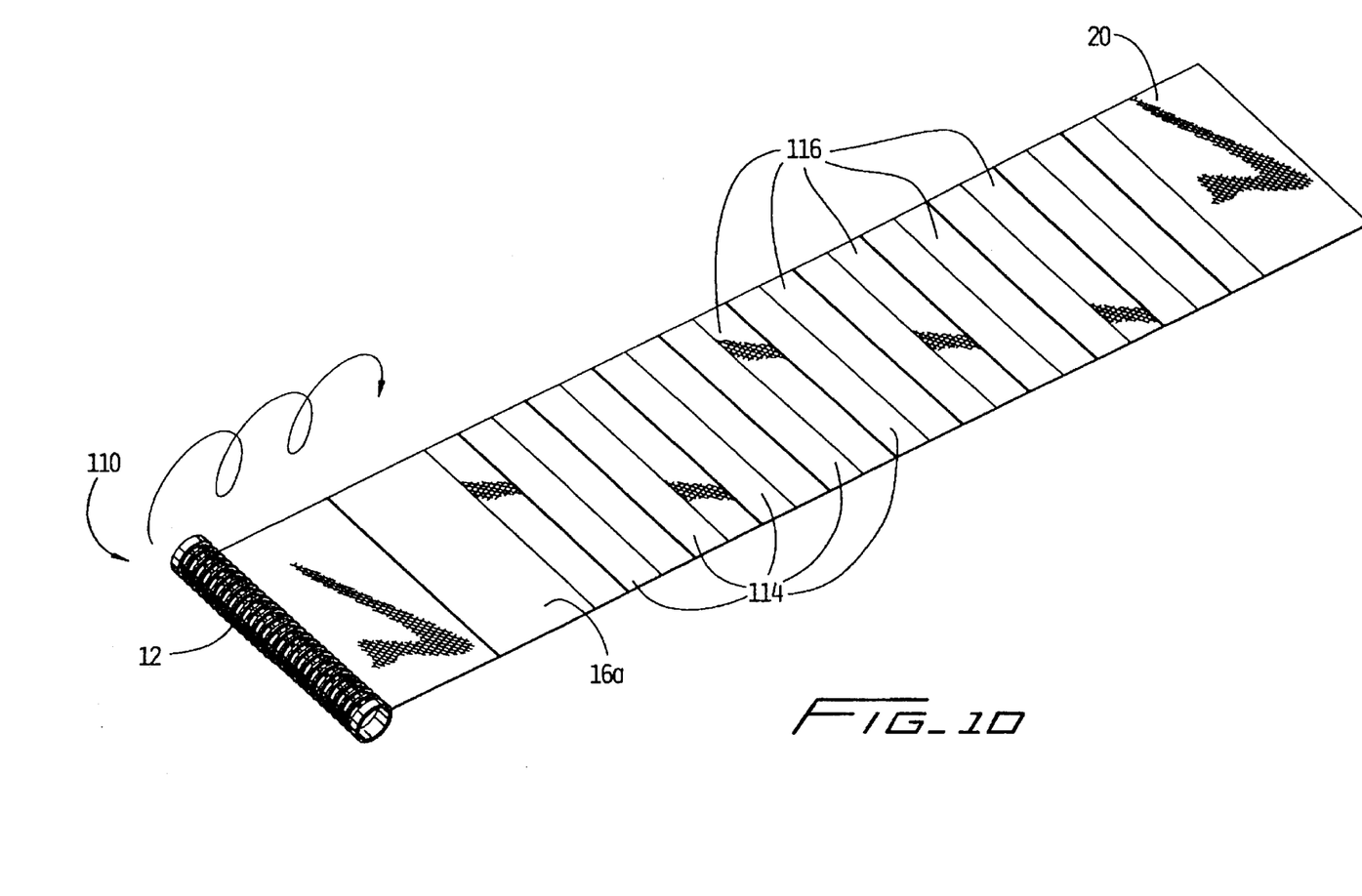
FIG. 10 shows an isometric view of a continuous sheet of non-filtering diffusion medium, a sheet of filter medium, and spaced-apart strips of filter medium being wound onto a core to form an alternative filter cartridge according to the present disclosure.

Referring to FIG. 10, a further filter cartridge 110 according to the present disclosure is shown (filter cartridge 110 is not shown with end caps; as will be readily apparent to persons of skill in the art). The filter cartridge 110 is similar to the filter cartridge 70 of FIG. 7, and elements that are the same have the same reference numerals. The filter cartridge 110 includes a filter having a single continuous sheet of diffusion medium 20 and at least one sheet of filter medium 16a wound around a core 12. The filter 110 also includes strips of filter medium 114 wound within the sheet of diffusion medium 20 between the sheet of filter medium 14 and the outer diameter of the filter. The strips 114 are spaced apart to create gaps that comprise bypass apertures 116.

As shown, the strips of filter medium 114 are arranged longitudinally with respect to the core 12, but the strips can be oriented in other directions, such as diagonally with respect to the core. The strips 114 are equally spaced apart from one another such that the resulting bypass gaps 116 are of substantially equal size. Alternatively, the strips can be spaced such that the resulting bypass gaps become larger towards the outer diameter of the respective filters, for example. It has been found that a filter cartridge 110 of the type disclosed in FIG. 10 provides about the same improved performance as provided by the filter cartridge 10 disclosed in FIG. 7.

The presently disclosed filter cartridges can be used in a variety of end uses, including, but not limited to, chemical and hydrocarbon applications such as polyethylene manufacturing, food amid beverage applications, electronic applications such as circuit board construction, coating applications such as high quality spray painting, and industrial applications such as paper manufacturing. It should be noted that while the examples of filters disclosed herein are elongated tubes with cylindrical cross-sections, filters in accordance with the present disclosure can be provided in other suitable configurations, such as elongated tubes with a square, elliptical, or oval cross-sections.

The filters and methods according to the present disclosure have been described in detail in the foregoing specification, with specific examples provided. Filters and methods in accordance with the present disclosure, however, are not to be construed as limited to the particular examples shown, as these examples are regarded as illustrious rather than restrictive. Moreover, variations and changes may be made to the exemplary filters by those skilled in the art without departing from the spirit of the present disclosure as set forth by the following claims.

What is claimed is:

1. A spiral wound filter element comprising:
   alternating layers of filter medium and diffusion medium wrapped about a cylindrical core defining a central axis of the filter element, the alternating layers extending from a radially innermost layer of the filter element to a radially outmost layer of the filter element, the diffusion medium defined by a continuous lengthwise sheet of mesh material, the filter medium defined by at least one sheet of filter material arranged along the length of the continuous sheet of mesh material, the alternating layers of filter medium and diffusion medium defining three distinct radially disposed layered filtering sections surrounding the cylindrical core, including a fist filtering section having radially outer prequalifying layers, a second filtering section having middle prequalifying layers and a third filtering section having radially inner qualifying layers, the radially outer prequalifying layers and the middle prequalifying layers defining about two-thirds of the radial distance from the radially outermost layer of the filter element to the radially innermost layer of the filter element, wherein:
   a) the filter material within the radially outer prequalifying layers includes a number of perforations forming radially extending by-pass apertures;
   b) the filter material within the middle prequalifying layers includes a fewer number of perforations forming radially extending by-pass apertures than a perforated sheet of the radially outer prequalifying layers; and
   c) the first material within the radially inner qualifying layers is imperforate.

2. A spiral wound filter element as recited in claim 1, wherein the filter medium is defined by a plurality of discrete sheets of filter material arranged along the length of the continuous sheet of mesh material.

3. A spiral wound filter element as recited in claim 2, wherein the radially inner qualifying layers include at least one imperforate sheet of filter material.

4. A spiral wound filter element as recited in claim 2, wherein the middle prequalifying layers include at least one perforated sheet of filter material.

5. A spiral wound filter element as recited in claim 2, wherein the radially outer prequalifying layers include at least one perforated sheet of filter material.

6. A spiral wound filter element as recited in claim 2, wherein each sheet of filter material has a consistent pore size.

7. A spiral wound filter element as recited in claim 2, wherein each sheet of filter material has a consistent fiber geometry.

8. A spiral wound filter element as recited in claim 2, wherein sheets of filter material have different pore sizes.

9. A spiral wound filter element as recited in claim 2, wherein sheets of filter material have different fiber geometries.

10. A spiral wound filter element as recited in claim 1, wherein the alternating layers of filter medium and diffusion medium are wrapped about a perforated cylindrical core.

11. A spiral wound filter element as recited in claim 10, wherein an innermost portion of the diffusion medium is wrapped at least once around the core to form an inner layer of diffusion medium.

12. A spiral wound filter element as recited in claim 1, wherein the diffusion medium is defined by a continuous lengthwise sheet of extruded polymeric mesh material.

13. A spiral wound filter element as recited in claim 12, wherein the extruded polymeric mesh material is a bi-planar mesh material.

14. A spiral wound filter element as recited in claim 1, wherein the filter material within the outer prequalifying layers has about twice as many perforations as the filter material within the middle prequalifying layers.

15. A spiral wound filter element as recited in claim 1, wherein an outermost portion of the diffusion medium is wrapped at least once around the outermost layer of the filter element to form an outer layer of diffusion medium.

16. A spiral wound filter element comprising:
   alternating layers of filter medium and diffusion medium wrapped about a cylindrical core defining a central axis of the filter element, the alternating layers extending from a radially innermost layer of the filter element to a radially outermost layer of the filter element, the diffusion medium defined by a continuous lengthwise sheet of mesh material, the filter medium defined by a plurality of discrete sheets of filter material arranged along the length of the continuous sheet of mesh material, the alternating layers of filter medium and diffusion medium defining three distinct radially disposed layered filtering sections, including a first filtering section having radially outer prequalifying layers, a second filtering section having middle prequalifying layers and a third filtering section having radially inner qualifying layers, wherein:
   a) the radially outer prequalifying layers include at least one perforated sheet of filter material having a number of perforations forming radially extending by-pass apertures;
   b) the middle prequalifying layers include at least one perforated sheet of filter material having a fewer number of perforations forming radially extending by-pass apertures than a perforated sheet of the radially outer prequalifying layers; and
   c) the radially inner qualifying layers include at least one imperforate sheet of filter material.

17. A spiral wound filter element as recited in claim 16, wherein the alternating layers of filter medium and diffusion medium are wrapped about a perforated cylindrical core.

18. A spiral wound filter element as recited in claim 17, wherein an innermost portion of the diffusion medium is wrapped at least once around the core to form an inner layer of diffusion medium.

19. A spiral wound filter element as recited in claim 16, wherein the diffusion medium is defined by a continuous lengthwise sheet of extruded polymeric mesh material.

20. A spiral wound filter element as recited in claim 19, wherein the extruded polymeric mesh material is a bi-planar mesh material.

21. A spiral wound filter element as recited in claim 16, wherein the radially inner qualifying layers define about one-third of the radial distance from the radially innermost layer of the filter element to the radially outermost layer of the filter element.

22. A spiral wound filter element as recited in claim 21, wherein the radially outer prequalifying layers and the middle prequalifying layers define about two-thirds of the radial distance from the radially outermost layer of the filter element to the radially innermost layer of the filter element.

23. A spiral wound filter element as recited in claim 16, wherein a perforated sheet of the outer prequalifying layers has about twice as many perforations as a perforated sheet of the middle prequalifying layers.

24. A spiral wound filter element as recited in claim 16, wherein the radially inner qualifying layers include two imperforate sheets of filter material.

25. A spiral wound filter element as recited in claim 16, wherein the middle prequalifying layers include two perforated sheets of filter material.

26. A spiral wound filter element as recited in claim 16, wherein the radially outer prequalifying layers include two perforated sheets of filter material.

27. A spiral wound filter element as recited in claim 16, wherein each sheet of filter material has a consistent pore size.

28. A spiral wound filter element as recited in claim 16, wherein each sheet of filter material has a consistent fiber geometry.

29. A spiral wound filter element as recited in claim 16, wherein sheets of filter material have different pore sizes.

30. A spiral wound filter element as recited in claim 16, wherein sheets of filter material have different fiber geometries.

31. A spiral wound filter element as recited in claim 16, wherein an outermost portion of the diffusion medium is wrapped at least once around the outermost layer of the filter element to form an outer layer of diffusion medium.

32. A spiral wound filter element comprising:
   alternating layers of filter medium and diffusion medium wrapped about a cylindrical core defining a central axis of the filter element, the alternating layers extending from a radially innermost layer of the filter element to a radially outermost layer of the filter element, the diffusion medium defined by a continuous lengthwise sheet of bi-planar mesh material, the filter medium defined by a plurality of discrete sheets of filter material arranged along the length of the continuous sheet of mesh material, the alternating layers of filter medium and diffusion medium defining three distinct radially disposed layered filtering sections, including a first filtering section having radially outer prequalifying layers, a second filtering section having middle prequalifying layers and a third filtering section having radially inner qualifying layers, wherein:
   a) the radially outer prequalifying layers include two perforated sheets of filter material each having a number of perforations forming radially extending by-pass apertures;
   b) the middle prequalifying layers include two perforated sheets of filter material each having a fewer number of perforations forming radially extending by-pass apertures than the perforated sheets of the radially outer prequalifying layers; and
   c) the radially inner qualifying layers include two imperforate sheets of filter material.

33. A spiral wound filter element as recited in claim 32, wherein the perforated sheets of the outer prequalifying layers have about twice as many perforations as the perforated sheets of the middle prequalifying layers.

34. A spiral wound filter element as recited in claim 33, wherein the alternating layers of filter medium and diffusion medium are wrapped about a perforated cylindrical core.

35. A spiral wound filter element as recited in claim 34, wherein an innermost portion of the diffusion medium is wrapped at least once around the core to form an inner layer of diffusion medium.

36. A spiral wound filter element as recited in claim 33, wherein the radially inner qualifying layers define about one-third of the radial distance from the radially innermost layer of the filter element to the radially outermost layer of the filter element.

37. A spiral wound filter element as recited in claim 33, wherein the radially outer prequalifying section and the middle prequalifying section define about two-thirds of the radial distance from the radially outermost layer of the filter element to the radially innermost layer of the filter element.

38. A spiral wound filter element as recited in claim 33, wherein each sheet of filter material has a consistent pore size and a consistent fiber geometry.

39. A spiral wound filter element as recited in claim 33, wherein sheets of filter material have different pore sizes.

40. A spiral wound filter element as recited in claim 33, wherein sheets of filter material have different fiber geometries.

41. A spiral wound filter element as recited in claim 33, wherein an outermost portion of the diffusion medium is wrapped at least once around the outermost layer of the filter element to form an outer layer of diffusion medium.

42. A spiral wound filter element as recited in claim 33, wherein the bi-planar mesh material is defined by a continuous lengthwise sheet of extruded polymeric mesh material.

* * * * *

UNITED STATES PATENT AND TRADEMARK OFFICE
CERTIFICATE OF CORRECTION

PATENT NO.     : 6,391,200 B2  
DATED          : May 21, 2002  
INVENTOR(S)    : Pulek et al.

It is certified that error appears in the above-identified patent and that said Letters Patent is hereby corrected as shown below:

<u>Title page,</u>  
The title should read:  
-- SPIRAL WOUND FILTER --

Signed and Sealed this

Eighth Day of October, 2002

*Attest:*

*Attesting Officer*

JAMES E. ROGAN  
*Director of the United States Patent and Trademark Office*